United States Patent [19]

Dartey et al.

[11] Patent Number: 4,948,617
[45] Date of Patent: Aug. 14, 1990

[54] LOW CHOLESTEROL MAYONNAISE SUBSTITUTE AND PROCESS FOR ITS PREPARATION

[75] Inventors: Clemence K. Dartey, Oakland; Thomas M. Trainor, Sparta, both of N.J.; Richard Evans, South Norwalk, Conn.

[73] Assignee: Nabisco Brands, Inc., East Hanover, N.J.

[21] Appl. No.: 275,285

[22] Filed: Nov. 23, 1988

[51] Int. Cl.$^5$ .............................................. A23D 7/00
[52] U.S. Cl. .................... 426/602; 426/604; 426/605; 426/613
[58] Field of Search ................ 426/602, 605, 613, 604

[56] References Cited

U.S. PATENT DOCUMENTS

| | | | |
|---|---|---|---|
| 3,692,543 | 9/1972 | Powell | 426/602 |
| 3,764,347 | 10/1973 | Katz | 426/602 |
| 3,892,873 | 7/1975 | Kolen et al. | 426/602 |
| 4,059,458 | 11/1977 | Germino et al. | 426/605 |
| 4,199,608 | 4/1980 | Gilmore et al. | 426/583 |
| 4,293,574 | 10/1981 | Mikami et al. | 426/605 |
| 4,304,795 | 12/1981 | Takada et al. | 426/602 |
| 4,562,086 | 12/1985 | Smolka et al. | 426/578 |
| 4,650,690 | 3/1987 | Bams et al. | 426/602 |

FOREIGN PATENT DOCUMENTS

57-105159-A 6/1982 Japan.
57-186463-A 11/1982 Japan.

*Primary Examiner*—Donald E. Czaja
*Assistant Examiner*—Helen Pratt

[57] ABSTRACT

The present invention relates to a low cholesterol mayonnaise substitute which contains substantially no egg yolk or starch thickeners. The mayonnaise substitute comprises water, a vegetable oil, a food grade acidulent, egg whites, a food grade emulsifier with a hydrophillic-lipophillic balance ("HLB") of 10-18, at least one edible gum, flavoring, coloring, and spices in a stable oil-in-water emulsion. With this formulation, the mayonnaise substitute of the present invention is able to achieve substantially the same flavor profile as real mayonnaise and a texture profile at least as good as that of real mayonnaise. The low cholesterol mayonnaise substitute of the present invention is prepared by mixing an aqueous slurry of emulsifier and other water soluble or suspendible ingredients with a slurry of gum in a small amount of oil to form an emulsifier blend, adding egg whites to the emulsifier blend, pouring oil into the emulsifier blend containing egg white to form an oil-in-water emulsion, adding a food grade acidulent, sparging nitrogen gas into the acidulent containing emulsion, and homogenizing the oil-in-water emulsion.

31 Claims, 4 Drawing Sheets

LOW CHOLESTEROL MAYONNAISE SUBSTITUTE AND PROCESS FOR ITS PREPARATION

BACKGROUND OF THE INVENTION

Mayonnaise is a thick, viscous, non-pourable food dressing which has achieved great popularity for use in a variety of salads containing vegetables, meat, or seafood. The regulations of the Food and Drug Administration state that mayonnaise must contain vegetable oil, acidifying ingredients, egg yolk-containing ingredients, and, optionally, any number of spices, preservatives, or crystallization inhibitors. The oil content in mayonnaise must be not less than 65 wt. %.

The egg yolk in mayonnaise has a significant role, because it imparts a desirable flavor and functions as an emulsifier. Nevertheless, egg yolk possesses two serious drawbacks relating to consumer usage and storage.

One problem with egg yolk is that it has a very high cholesterol level. Medical authorities have determined that humans having a high level of cholesterol in their blood are susceptible to heart attacks. To avoid the risk of heart disease, many, especially those with high blood cholesterol levels, have reduced their consumption of products containing high levels of cholesterol, including egg yolk. Accordingly, the reduction of egg yolk from mayonnaise to reduce its cholesterol content would be highly desirable.

Egg yolk also may reduce the period mayonnaise can be stored due to the susceptibility of egg to microbiological spoilage. More particularly, egg yolk may contain certain microorganisms prior to its use in mayonnaise which may ultimately contaminate the entire mayonnaise product, especially after the consumer has opened it. Mayonnaise, therefore, generally may have a shortened shelf life. The elimination of egg yolk from mayonnaise-type products would, therefore, benefit that product's storage capability.

Although a number of mayonnaise substitutes have been developed, all have serious deficiencies.

One approach has been to replace egg yolk with a starch paste for thickening and edible gums for emulsification, as suggested by U.S. Pat. No. 3,764,347 to Katz ("Katz"). U.S. Pat. No. 3,692,543 to Powell, U.S. Pat. No. 4,059,458 to Germino et al., and U.S. Pat. No. 4,562,086 to Smolka also suggest the use of starches in salad dressings or mayonnaise to reduce or eliminate the quantity of egg yolk utilized. The use of a starch paste, however, requires an increase in the extent and cost of processing and tends to affect adversely the texture of the mayonnaise substitute. Moreover, the combination of starch paste and edible gums cannot maintain a stable oil-in-water emulsion at the high oil levels usually present in real mayonnaise. This high level of oil in real mayonnaise makes its oil-in-water emulsion susceptible to breaking, and the problem becomes more pronounced when starch paste and edible gums are used instead of egg yolk. As a result, the oil content of mayonnaise substitutes with these ingredients must be reduced to maintain stability. This change in oil content further adversely affects the flavor and texture of the mayonnaise substitute compared to real mayonnaise. In effect, such mayonnaise substitutes (rather than being like real mayonnaise) assume the characteristics of a salad dressing, which, under FDA standards, are permitted to use starch paste and have oil contents as low as 30%.

Another approach to preparing low cholesterol, dressing-type products, including mayonnaise, is to replace the egg yolk with a proteinaceous emulsifier. Examples of such mayonnaise substitutes are disclosed by U.S. Pat. No. 4,293,574 to Mikami et al., U.S. Pat. No. 4,304,795 to Takada et al., U.S. Pat. No. 3,892,873 to Kolen et al. ("Kolen"), Japanese Patent Application No. 57-186,463, and Japanese Patent Application No. 57-105,159. Generally, however, such formulations also have a relatively low oil level which causes them to differ in texture and flavor from real mayonnaise. Kolen suggests using higher oil levels, but the use of its proteinaceous emulsifier is expensive, because a serum protein derived from milk is utilized which must undergo heat processing to achieve a particular level of denaturation. Further, once this denaturation level is achieved, special handling and drying techniques are required to maintain that level.

SUMMARY OF THE INVENTION

Unlike prior art mayonnaise substitutes, the mayonnaise substitute of the present invention has a flavor profile substantially the same as real mayonnaise and an improved texture profile, despite the elimination of egg yolk. These texture and flavor profiles are achieved without using starch pastes or partially denatured protein emulsifiers which have a significant negative impact upon these properties. Moreover, the increased processing cost associated with the use of starch pastes and partially denatured protein emulsifiers in mayonnaise substitutes is avoided.

The mayonnaise substitute of the present invention includes water, vegetable oil, a food grade acidulent, flavoring, coloring, spices, preservatives, and a texturization and emulsification system comprising an egg white material, an edible emulsifier, and at least one gum. An important aspect of the present invention is the texturization and emulsification system which enables the mayonnaise substitute to stably employ high levels of oil (i.e., over 65% but less than 85%). This texturization and emulsification system obviates the need to resort to starch pastes or protein emulsifiers which are expensive, use lower levels of oil, and adversely affect flavor and texture.

The mayonnaise substitute of the present invention is prepared by mixing an aqueous slurry of emulsifier and other water soluble or suspendible ingredients with a slurry of gum in a small amount of oil. Egg white material is added next followed by the addition of a large quantity of oil to form an oil-in-water emulsion. Next, a food grade acidulent is added to the emulsion. The emulsion is then homogenized with gas bubbles to form the mayonnaise substitute.

DETAILED DESCRIPTION OF THE INVENTION

The mayonnaise substitute of the present invention comprises water, an edible oil, a food grade acidulent, flavoring, spices, coloring, and a texturization and emulsification system comprising an egg white material, at least one gum, and an emulsifier with an HLB of 10-18 in a substantially stable oil-in-water emulsion having properties like real mayonnaise.

The water in the mayonnaise substitute is present in an amount of 5 to 30 wt. %, preferably 15-22 wt. %.

The food grade acidulent can be white vinegar, cider vinegar, lemon juice, citric acid, lactic acid, tartaric acid, malic acid, and mixtures thereof. Preferably, the acidulent in the mayonnaise substitute is mostly white vinegar with smaller portions of cider vinegar and lemon juice. The acidulent is present in the mayonnaise substitute in an amount of 1.0 to 5.0 wt. %, preferably 3.0-4.0 wt. %. The purpose of the acidulent is to act as a preservative and to give the mayonnaise substitute the characteristic tartness commensurate with the FDA's regulations which require real mayonnaise to contain at least 2.5 wt. % of acetic acid.

The edible oil in the mayonnaise substitute can be any vegetable oil, including canola oil, corn oil, soybean oil, olive oil, sunflower oil, safflower oil, cottonseed oil, and mixtures thereof. Canola oil, a low erucic acid rape seed oil, is preferred. The mayonnaise substitute contains 65 to 85 wt. % of vegetable oil, preferably 75 wt. %.

The egg white material in the mayonnaise substitute imparts the desired texture and egg character and can be, for example, in the form of liquid egg whites (fresh or frozen), dried egg whites, or mixtures thereof, preferably liquid egg whites. The egg white material is present in the mayonnaise substitute in an amount of 0.5 to 15 wt. %, preferably about 10.0 wt. % for liquid egg whites or about 2 wt. % for dried egg whites. To the extent these egg white materials contain proteins, these proteins are substantially undenatured such that the egg white, by itself, is incapable of emulsifying the oil and water at oil levels of at least 65 wt. % but not more than 85 wt. %.

The food grade emulsifier can be any edible emulsifier with a hydrophillic-lipophillic balance ("HLB") of 10-18 such as polyoxyethylene sorbitan fatty acid esters (e.g., polyoxyethylene sorbitan monolaurate [i.e., polysorbate 20], polyoxyethylene sorbitan monostearate [i.e., polysorbate 60], polyoxyethylene sorbitan monooleate [i.e., polysorbate 80], and polyoxyethylene sorbitan tristearate [i.e., polysorbate 65]), polyglycerol esters (e.g., decaglycerol dioleate, decaglycerol mono-dioleate), ethoxylated mono- and di-glycerols, or mixtures thereof. The preferred material is polyoxyethylene sorbitan monooleate. The emulsifier is present in the mayonnaise substitute in an amount of 0.05 to 0.5 wt. %, preferably 0.15 wt. %. The amount of this component in the mayonnaise substitute is restricted to these levels, because, at higher levels, the taste of the mayonnaise substitute would be adversely affected.

The edible gums employed in the emulsifier system include xanthan gum, guar gum, gum tragacanth, gum arabic, locust bean gum, alginates, pectins, or mixtures thereof. The preferred gum is a blend of xanthan gum, locust bean gum, and guar gum, known as GFS ® gum from the Kelco Division of Merck & Co., Inc. The edible gum is utilized in an amount of 0.10 to 2.0 wt. %, preferably 0.4 wt. %. The edible gum is utilized to supplement the food grade emulsifier which, as noted above, can be used only in limited amounts.

The flavoring and spices used in the mayonnaise substitute include salt, mustard or mustard oil, pepper, egg flavors, paprika, yeast extract, flavor enhancers, and mixtures thereof. These flavorings and spices are present in the mayonnaise substitute in an amount of 0.5 to 8.0 wt. %, preferably 2.5 wt. %.

The mayonnaise substitute also includes coloring such as beta carotene, egg yolk colorings, oleo resin paprika, and mixtures thereof. Such colorings are present in the mayonnaise substitute in an amount of 0.005 to 0.05 wt. preferably 0.01 wt. %.

To insure long shelf life, the mayonnaise substitute also includes preservatives such as sodium benzoate, potassium sorbate, calcium disodium ethylenediamine tetracetic acid, and mixtures thereof. These preservatives are present in the mayonnaise substitute in an amount of 0.05 to 0.12 wt. %, preferably 0.11 wt. %.

The mayonnaise substitute of the present invention is prepared by first mixing a slurry of the gum system in a small amount of edible oil with an aqueous suspension containing the food grade emulsifier, preservatives, coloring, flavoring, and spices to form an emulsifier blend. Egg whites are then added, followed by the step of adding a large amount of the edible oil to form an oil-in-water emulsion. The food grade acidulent is then added to the emulsion which effects further thickening, and the oil-in-water emulsion is then sparged with gas and homogenized to form the low cholesterol mayonnaise substitute.

The various mixing steps take place in a mixer or blender. Homogenization occurs in a colloid mill at a setting of 50 to 110 thousandths of an inch, preferably 60-70 thousandths of an inch. Gas bubbles are injected into the pipe connecting the mixer and homogenizer, preferably at the homogenizer inlet.

The gas bubbles may be any inert gas, or gas mixtures, preferably nitrogen. These gas bubbles are injected into the oil-in-water emulsion to give the resulting mayonnaise substitute a lighter density. The gas bubbles are injected into the oil-in-water emulsion so that the final mayonnaise substitute has a specific gravity of 0.85 to 0.98, preferably 0.91-0.92.

The process of preparing the mayonnaise substitute takes place at temperatures of 50° F. to 85° F., preferably 65° F. Generally, the step of mixing the slurry of gum and oil with the aqueous solution of food grade emulsifier and other water soluble or suspendible ingredients takes 4 to 10 minutes, preferably 6 minutes. The egg whites are blended into this emulsifier blend in 1 to 3 minutes, preferably 2 minutes. The edible oil is added to the emulsifier blend over a period of 1 to 3 minutes, preferably 2 minutes, while the food grade acidulent is mixed into the resulting emulsion over a period of 1 to 3 minutes, preferably 2 minutes.

By following the processing sequence set forth above, the oil-in-water emulsion assumes a viscosity, using a Brookfield brand RV Series viscometer with a TCD spindle at 4 rpm, of 50,000-110,000 centipoise, preferably 75,000-85,000 centipoise, immediately before homogenization. During storage after homogenization, the mayonnaise substitute stabilizes at a viscosity, using a Brookfield RV Series viscometer with a TCD spindle at 4 rpm, of 90,000-200,000 centipoise, preferably 120,000-180,000 centipoise. Although the acidulent (usually vinegar) can be added prior to the oil, it has been found that if the acidulent is added after the oil, improved gelling and thickening of the resulting mayonnaise substitute is achieved. More particularly, it has been found that the mayonnaise substitute has a viscosity, using a Brookfield RV Series viscometer with a TCD spindle at 4 rpm, of 90,000 to 200,000 centipoise, usually 120,000–180,000 centipoise after homogenization if the vinegar is added after the oil. By contrast, if the vinegar is added before the oil, the mayonnaise substitute has a viscosity, using a Brookfield RV Series viscometer with a TCD spindle at 4 rpm, of 80,000 to 120,000 centipoise, usually 95,000–110,000 centipoise after homogenization.

EXAMPLES

Example Nos. 1 and 2

Two low cholesterol mayonnaise substitutes were prepared from the following ingredients:

|  | Example 1 Wt. % | Example 2 Wt. % |
| --- | --- | --- |
| Corn Oil | 75.000 | 69.000 |
| Water | 16.470 | 19.650 |
| Vinegar | 3.300 | 4.500 |
| Sugar | 2.000 | 2.000 |
| Salt | 1.500 | 1.500 |
| Egg Whites | 1.000 | 2.500 |
| Xanthan Gum | .200 | .250 |
| Locust Bean Gum | .200 | .250 |
| Polysorbate 60 | .150 | .150 |
| Mayonnaise Flavoring & Coloring | .060 | .080 |
| Potassium Sorbate | .100 | .100 |
| Onion Flavor | .010 | .010 |
| Garlic Flavor | .010 | .010 |

These ingredients were blended by mixing the water, the polysorbate 60, and the potassium sorbate for one minute, adding the egg white with the sugar, the salt, and the spices, adding the gums in an oil slurry and mixing for two minutes, adding the vinegar and mixing for one minute, and very, very slowly adding the oil and flavoring. The resulting oil-in-water emulsion was then milled to produce a stiff low cholesterol mayonnaise substitute.

Example No. 3

A low cholesterol mayonnaise substitute was prepared from the following ingredients:

|  | Weight % |
| --- | --- |
| Liquid Corn Oil | 70.0000 |
| Vinegar | 4.5000 |
| Polysorbate 60 | 0.1500 |
| Xanthan Gum | 0.2500 |
| Locust Bean Gum | 0.2500 |
| Mayonnaise Flavoring and Coloring | 0.1500 |
| High Fructose Corn Syrup | 3.0000 |
| Water | 11.7850 |
| Granular Salt | 1.5000 |
| Liquid Egg Whites | 8.0000 |
| Onion Flavor | 0.0100 |
| Garlic Flavor | 0.0050 |
| Black Pepper | 0.1000 |
| Potassium Sorbate | 0.1000 |
| Lemon Juice | 0.2000 |

These ingredients were blended in substantially the same manner as those of Examples 1 and 2 to produce the mayonnaise substitute.

Example 4

A low cholesterol mayonnaise substitute was prepared from the following ingredients:

|  | Weight % |
| --- | --- |
| Liquid Canola Oil | 71.0000 |
| Vinegar | 3.7000 |
| Polysorbate 60 | 0.1500 |
| Xanthan Gum | 0.2500 |
| Locust Bean Gum | 0.2500 |
| Mayonnaise Flavoring and Coloring | 0.1500 |
| High Fructose Corn Syrup | 3.0000 |
| Water | 8.4800 |
| Granular Salt | 1.5000 |
| Liquid Egg Whites | 8.0000 |
| Onion Flavor | 0.0100 |
| Garlic Flavor | 0.0050 |
| Black Pepper | 0.1000 |
| Sodium Benzoate | 0.1000 |
| Lemon Juice | 0.2000 |
| Mustard | 3.0000 |
| Beta Carotene | 0.0050 |
| Yeast Extract | 0.1000 |

These ingredients were blended to produce the low cholesterol mayonnaise substitute in substantially the same manner as Examples 1 and 2.

Example 5

A low cholesterol mayonnaise substitute was prepared from the following ingredients:

|  | Wt. % |
| --- | --- |
| Canola Oil | 73.608 |
| Liquid Egg Whites | 9.000 |
| Water | 7.600 |
| High Fructose Corn Syrup | 3.000 |
| White Vinegar | 3.000 |
| Cider Vinegar | 0.800 |
| Salt | 1.500 |
| Mustard | 0.500 |
| GFS$^R$ Gum | 0.400 |
| Polysorbate 80 | 0.150 |
| Sodium Benzoate | 0.100 |
| Yeast Extract | 0.100 |
| Black Pepper | 0.010 |
| Beta Carotene | 0.015 |
| Ca/Na$_2$ EDTA | 0.006 |
| Mayonnaise Flavoring and Coloring | 0.211 |

From these ingredients, the mayonnaise substitute was prepared by suspending the gum with three times its weight of a portion of the canola oil and adding to a mixing tank the gum slurry, water, high fructose corn syrup, sodium benzoate, salt, EDTA, beta carotene, black pepper, polysorbate 80, yeast extract, mustard, and spice/flavor blend. The slurry was then mixed until it began to thicken, and then vinegar was added and mixed until a smooth consistency was achieved. These materials, the egg white, and the canola oil were all pumped into a colloid mill and mixed at a setting of 100 thousandths of an inch to achieve a maximum temperature increase of 10° F. Nitrogen gas was then injected to achieve a specific gravity of 0.92.

Example No. 6

A low cholesterol mayonnaise substitute was prepared from the following ingredients:

|  | Weight % |
| --- | --- |
| Canola Oil (Refined, Bleached, Deodorized, and Winterized) | 73.600 |
| Liquid Egg White | 10.000 |
| Water | 7.870 |

-continued

| | Weight % |
|---|---|
| White Distilled Vinegar | 3.400 |
| Cider Vinegar | 0.600 |
| High Fructose Corn Syrup | 1.600 |
| Salt | 1.350 |
| Mustard | 0.500 |
| GFS$^R$ Gum | 0.400 |
| Polysorbate 80 | 0.150 |
| Sodium Benzoate | 0.100 |
| Yeast Extract | 0.060 |
| Beta Carotene | 0.008 |
| Black Pepper | 0.010 |
| Ca/Na$_2$ EDTA | 0.006 |
| Egg Flavoring | 0.170 |
| Mayonnaise Flavor | 0.150 |
| Mustard Oil | 0.006 |
| Paprika | 0.004 |
| Lemon Juice | 0.016 |

The mayonnaise substitute was prepared from these ingredients by first making a uniform slurry of gum in three times its weight of canola oil. The sodium benzoate was then dissolved in a portion of the water and added with the rest of the water, high fructose corn syrup, EDTA, beta carotene, salt, pepper, polysorbate 80, yeast extract, mustard, and spice/flavor blends to a mixing tank. This blend was then mixed at high speed for four to five minutes to achieve a smooth consistency with the gum slurry then being added and mixed in at high speed until the blend began to thicken. Liquid egg whites were then added to this mixture and blended at a high speed for one minute. A typical mayonnaise emulsion (i.e., an oil-in-water emulsion) was then formed by slowly adding canola oil to the blend while mixing at high speed. Vinegar and cider vinegar were then added and mixed at high speed for two minutes to effect thickening and gelling. The emulsion containing vinegar was then pumped into a colloid mill with a setting at 60 thousandths of an inch. Nitrogen gas was injected into the product just prior to homogenization to achieve a specific gravity of 0.915±0.005.

Example 7

The flavor and texture of the mayonnaise substitute produced in Example 5 was compared with Hellmann's ® real mayonnaise, which is believed to contain approximately 79.50 wt. % soybean oil, 7.60 wt. % whole liquid eggs, 3.50 wt. % vinegar, 3.50 wt. % water, 3.50 wt. % salted egg yolks, 1.20 wt. % sodium chloride salt, 1.00 wt. % sugar, 0.10 wt. % lemon juice, 0.10 wt. % natural flavors, and 0.01 wt. % EDTA. The flavor and texture characteristics of these products were determined and then compared by a taste panel of trained experts based on a number of factors, all of which constitute essentially a flavor profile and a texture profile.

The flavor profile included the following constituents: cooked egg (i.e., the flavor associated with a whole cooked egg), vinegar (i.e., the flavor associated with white vinegar), mustard (i.e., the flavor associated with a mustard condiment), lemon (i.e., the flavor associated with fresh lemons), oil (i.e., the flavor associated with vegetable oil), paprika (i.e., the flavor associated with the ground spice paprika), green spice (i.e., the flavor associated with green spices generally but somewhat distinguishable from dill), salt (i.e., the basic taste of salt as perceived by the tongue using five and ten percent saline solutions as upper and lower limit reference points, respectively), sour (i.e., the basic sour taste perceived by the tongue using five and ten percent citric acid solutions as upper and lower limit reference points, respectively), sweetness (i.e., the basic taste of sweetness as perceived by the tongue using two and five percent sucrose solutions as upper and lower limit reference points, respectively), pungency (i.e., the sensation detected in the nasal area by the tactile nerves described as a numbing or burning, such as that experienced with horseradish), and aftertaste (i.e., a taste or flavor lingering one minute after the product has been cleared from the mouth). These profile constituents were all evaluated on a scale of 0–150 with 0 having no intensity and 150 having a strong level of intensity. By conducting these flavor profile evaluations with eight trained, expert judges and three replications of the product of Example 5 and Hellmann's ® mayonnaise, the profile results set forth below in Table 1 were obtained.

TABLE 1

| FLAVOR ATTRIBUTES | HELLMAN'S MAYONNAISE | LOW CHOLESTEROL MAYONNAISE | STATISTICAL SIGNIFICANCE |
|---|---|---|---|
| Cooked Whole Egg | 53.2 | 59.2 | None |
| Vinegar | 53.1 | 53.2 | None |
| Mustard | 33.3 | 31.9 | None |
| Lemon | 33.6 | 33.8 | None |
| Oil | 21.9 | 18.8 | Significant |
| Paprika | 14.4 | 10.0 | Significant |
| Green Spice | 15.9 | 18.9 | None |
| Salt | 49.3 | 51.8 | None |
| Sour | 51.8 | 49.8 | None |
| Sweet | 31.1 | 36.3 | None |
| Pungency | 43.7 | 43.4 | None |
| Aftertaste | 10.9 | 11.7 | None |

Figure 1:
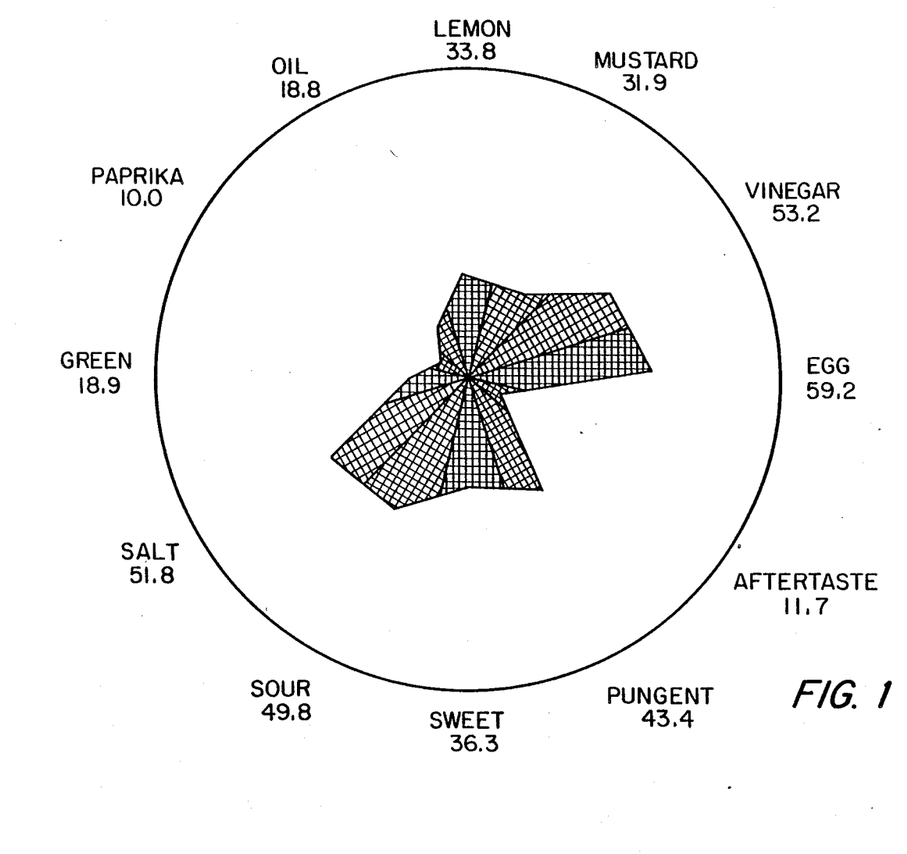
FIG. 1 shows the flavor profile for the mayonnaise substitute of Example 5.
Figure 2:
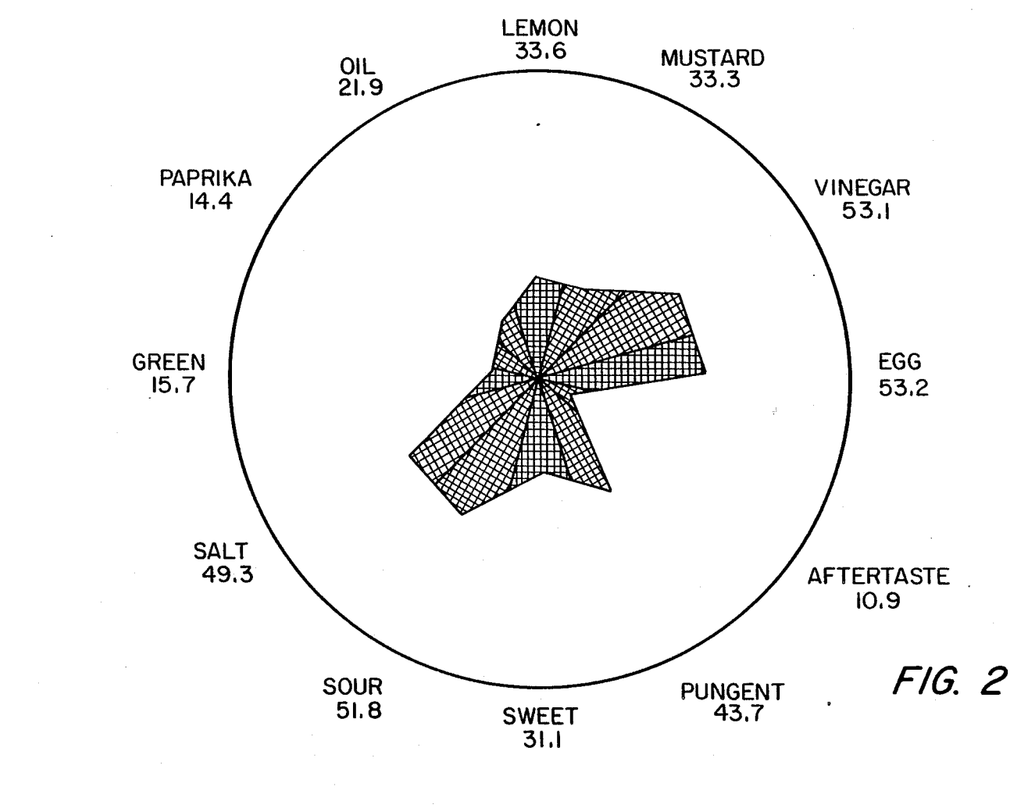
FIG. 2 shows the flavor profile for Hellmann's ® real mayonnaise.

These values were also plotted to give a visual impression of the test results with FIG. 1 showing the flavor profile for the mayonnaise substitute of Example 5, while FIG. 2 shows the flavor profile for Hellmann's ® mayonnaise. A comparison of these flavor profiles as plotted or as set forth in Table 1 with the statistical significance information indicates that the flavor profile of the mayonnaise substitute of Example 5 is indeed very close to that of Hellmann's ® mayonnaise.

The texture profile of the mayonnaise substitute of Exhibit 5 and Hellmann's ® mayonnaise were evaluated based on the following criteria: adhesiveness on a spoon (i.e., the degree to which the sample sticks to a spoon with water being the standard of non-adhesiveness, while peanut butter is the standard of adhesiveness), cut surface uniformity (i.e., the amount of visual uniformity with oatmeal being the standard of non-uniformity and jello being the standard of uniformity), spreadability (i.e., the degree to which a sample moves easily across another surface with cold peanut butter being the standard of non-spreadability and warm peanut butter being the standard of spreadability), and denseness (i.e., the compactness of a sample with aerosol whipped cream being the standard of non-denseness, while cream cheese was the standard of denseness). Again, these profile constituents were evaluated on a scale of 0 to 150 with 0 being a no intensity level and 150 being a strong intensity level. Samples of both products were evaluated with respect to these texture profile constituents by eight trained, expert judges through three replications with the results of these evaluations summarized below in Table 2.

TABLE 2

| TEXTURE ATTRIBUTES | HELLMAN'S MAYONNAISE | LOW CHOLESTEROL MAYONNAISE | STATISTICAL SIGNIFICANCE |
|---|---|---|---|
| Adhesiveness on Spoon | 100.8 | 55.4 | Very Highly Significant |
| Cut Surface Uniformity | 91.0 | 110.2 | Very Highly Significant |
| Spreadability | 111.4 | 122.5 | Highly Significant |
| Denseness | 66.1 | 63.1 | None |

Figure 3:
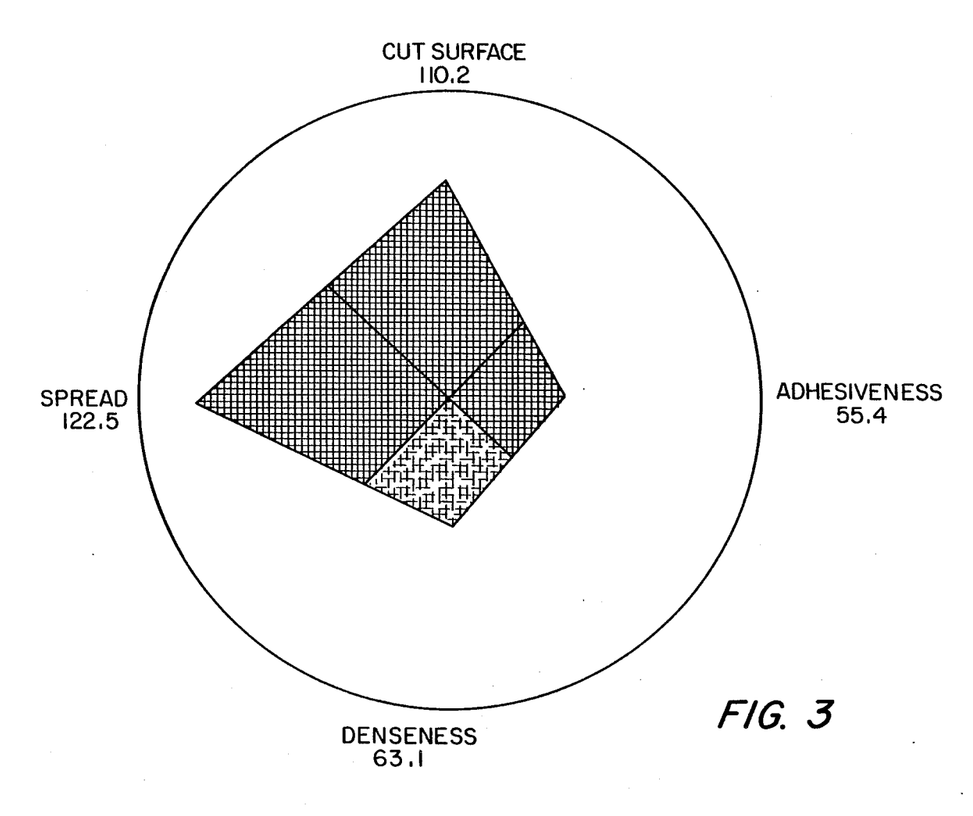
FIG. 3 shows the texture profile for the mayonnaise substitute of Example 5.
Figure 4:
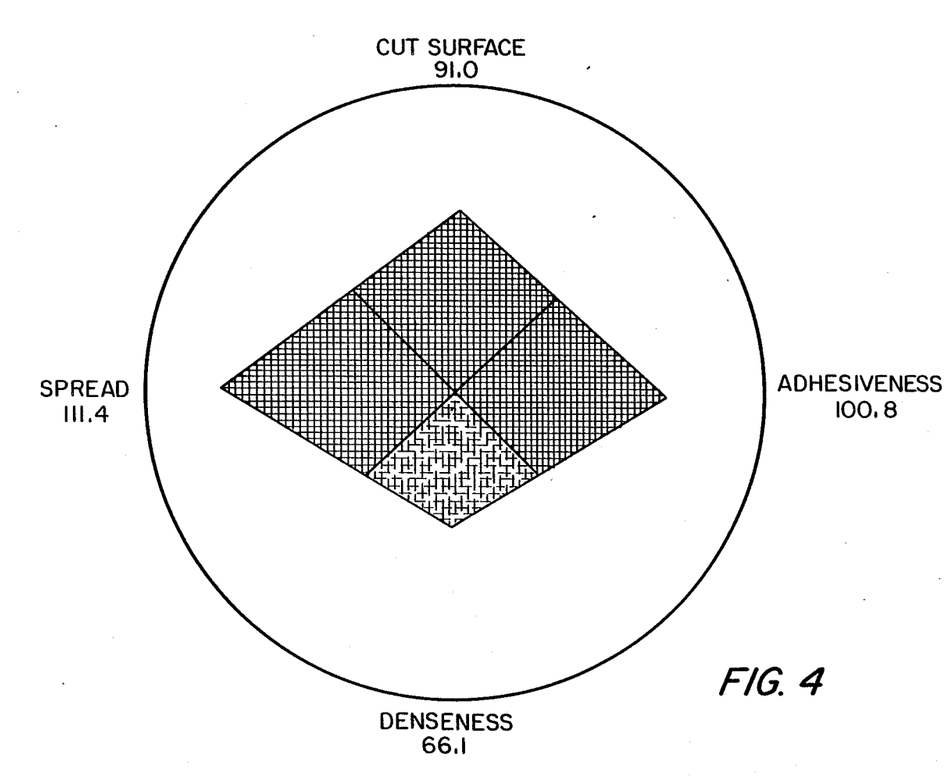
FIG. 4 shows the texture profile for Hellmann's ® real mayonnaise.

The tabulated results of these texture profile evaluations were plotted with FIG. 3 showing the texture profile results for the mayonnaise substitute of Example 5, while FIG. 4 shows the texture profile results for Hellmann's ® mayonnaise. From the tabulated and plotted results of the texture profile evaluations, it is apparent that the mayonnaise substitute of Example 5 has a density comparable to that of Hellman's ® mayonnaise and achieved a more uniform appearance, reduced adhesiveness to a spoon, and improved spreadability over the Hellman's ® product.

The mayonnaise substitute of the present invention is low in cholesterol. In the preferred form, it contains substantially no egg yolk, and, therefore, substantially no cholesterol. However, it would be within the scope of the present invention to prepare a low cholesterol mayonnaise with a reduced amount of yolk (compared to real mayonnaise), and, therefore, reduced levels of cholesterol.

Although the invention has been described in detail for the purpose of illustration, it is understood that such detail is solely for that purpose, and variations can be made therein by those skilled in the art without departing from the spirit and scope of the invention which is defined by the following claims.

We claim:

1. A low cholesterol mayonnaise substitute consisting essentially of:
   water;
   an edible oil, wherein said edible oil constitutes greater than 70% but less than 85% by weight of said low cholesterol mayonnaise substitute;
   a food grade acidulent; and a texturization and emulsification system comprising:
   (i) an egg white material incapable of emulsifying said water and said edible oil by itself at oil levels of greater than 70% but less than 85% by weight of said low cholesterol mayonnaise substitute;
   (ii) a non-proteinaceous food grade emulsifier with an HLB of 10-18; and
   (iii) at least one edible gum, said texturization and emulsification system being present in an amount sufficient to hold said water, said edible oil, and said food grade acidulent in a substantially stable oil-in-water emulsion having the properties of real mayonnaise.

2. A low cholesterol mayonnaise substitute according to claim 1, wherein the food grade emulsifier is selected from the group consisting of polyoxyethylene sorbitan fatty acid esters, polyglycerol esters, ethoxylated mono- and di-glycerols, and mixtures thereof.

3. A low cholesterol mayonnaise substitute according to claim 2, wherein the at least one gum is selected from the group consisting of xanthan gum, guar gum, gum tragacanth, gum arabic, locust bean gum, alginates, pectins, and mixtures thereof.

4. A low cholesterol mayonnaise substitute according to claim 3, wherein the food grade emulsifier is polyoxyethylene sorbitan monooleate and the at least one gum is a blend of xanthan gum, locust bean gum, and guar gum.

5. A low cholesterol mayonnaise substitute according to claim 4, wherein the polyoxyethylene sorbitan monooleate constitutes 0.05 to 0.5 wt. % of said mayonnaise substitute and the at least one gum constitutes 0.1 to 2.0 wt. % of said mayonnaise substitute.

6. A low cholesterol mayonnaise substitute according to claim 1 which further has:
   flavoring;
   spices; and
   coloring.

7. A low cholesterol mayonnaise substitute according to claim 1, wherein said food grade acidulent is selected from the group consisting of vinegar, lemon juice, citric acid, lactic acid, malic acid, tartaric acid, and mixtures thereof.

8. A low cholesterol mayonnaise substitute according to claim 7, wherein said food grade acidulent is a mixture of vinegar and lemon juice with the vinegar constituting 1.0 to 5.0 wt. % of said mayonnaise substitute and said lemon juice consisting of 0 to 1.0 wt. % of said mayonnaise substitute.

9. A low cholesterol mayonnaise substitute according to claim 1, wherein the egg white material is selected from the group consisting of liquid egg whites, dried egg whites, and mixtures thereof.

10. A low cholesterol mayonnaise substitute according to claim 9, wherein the egg white material constitutes 0.5 to 15 wt. % of said low cholesterol mayonnaise substitute.

11. A low cholesterol mayonnaise substitute according to claim 1, wherein said edible oil is selected from the group consisting of canola oil, corn oil, soybean oil, olive oil, safflower oil, sunflower oil, cottonseed oil, and mixtures thereof.

12. A low cholesterol mayonnaise substitute according to claim 1, wherein said low cholesterol mayonnaise has a viscosity, using a Brookfield RV Series viscometer with a TCD spindle at 4 rpm, of 90,000 to 200,000 centipoise.

13. A low cholesterol mayonnaise substitute consisting essentially of:
   water in an amount between about 5% and 30% by weight of said low cholesterol mayonnaise substitute;
   a mixture of vinegar and lemon juice, said mixture being present in an amount between about 1.0% and 5.0% by weight of said low cholesterol mayonnaise substitute; and
   canola oil, wherein said oil constitutes greater than 70% but less than 85% by weight of said low cholesterol mayonnaise substitute; and
   a texturization and emulsification system comprising;
   (i) an egg white material which constitutes between about 0.5% and 15% by weight of said low cholesterol mayonnaise substitute and being incapable of emulsifying said water and said edible oil by itself at oil levels greater than 70% but less than 85% of said low cholesterol mayonnaise substitute;
   (ii) polyoxyethylene sorbitan monooleate which is the food grade emulsifier and constitutes between about 0.05% and 0.5% by weight of said low cholesterol mayonnaise substitute; and (iii) at least one gum which is a blend of xanthan gum, locust bean gum, and guar gum and which constitutes between about 0.1% and 2.0% by weight of said low cholesterol mayonnaise substitute.

14. A low cholesterol mayonnaise substitute consisting essentially of:

water, constituting between about 5% and 30% by weight of said low cholesterol mayonnaise substitute;

an edible oil, wherein said oil constitutes greater than 70% but less than 85% by weight of said low cholesterol mayonnaise substitute;

a food grade acidulent constituting between about 1.0% and 5.0% by weight of said low cholesterol mayonnaise substitute; and a texturization and emulsification system comprising;
 (i) an egg white material constituting between about 0.5% and 15% by weight of said low cholesterol mayonnaise substitute and being incapable of emulsifying said water and said edible oil by itself at oil levels greater than 70% but less than 85% of said low cholesterol mayonnaise substitute;
 (ii) a non-proteinaceous food grade emulsifier with an HLB of 10–18, and constituting between about 0.05% and 0.5% by weight of said low cholesterol mayonnaise substitute; and
 (iii) at least one edible gum constituting between about 0.1% and 2.0% by weight of said low cholesterol mayonnaise substitute, said texturization and emulsification system being present in an amount sufficient to hold said water, said edible oil, and said food grade acidulent in a substantially stable oil-in-water emulsion having the properties of real mayonnaise;

nitrogen gas;
flavoring;
spices; and
coloring.

15. A non-starch-based, low cholesterol mayonnaise substitute comprising:
water
an edible oil;
a food grade acidulent; and
a texturization and emulsification system comprising:
 (i) an egg white material incapable of emulsifying said water and said edible oil by itself at oil levels of over 65% but less than 85% of said low cholesterol mayonnaise substitute;
 (ii) a non-proteinaceous food grade emulsifier with an HLB of 10–18; and
 (iii) at least one edible gum, said texturization and emulsification system being present in an amount sufficient to hold said water, said edible oil, and said food grade acidulent in a stable, oil-in-water emulsion having the properties of real mayonnaise.

16. A low cholesterol mayonnaise substitute according to claim 15, wherein the food grade emulsifier is present in an amount which will not adversely affect the taste of said mayonnaise substitute and constitutes 0.05 to 0.50 wt. % of said mayonnaise substitute and the at least one gum constitutes 0.1 to 2.0 wt. % of said mayonnaise substitute.

17. A low cholesterol mayonnaise substitute according to claim 15, wherein said food grade acidulent is selected from the group consisting of vinegar, lemon juice, citric acid, lactic acid, malic acid, tartaric acid, and mixtures thereof constituting 1.0 to 5.0 wt. % of said mayonnaise substitute.

18. A low cholesterol mayonnaise substitute according to claim 15, wherein the egg white material is selected from the group consisting of liquid egg whites, dried egg whites, and mixtures thereof, and wherein said egg white material constitutes 0.5 to 15 wt. % of said low cholesterol mayonnaise substitute.

19. A low cholesterol mayonnaise substitute according to claim 15, wherein said edible oil is selected from the group consisting of canola oil, corn oil, soybean oil, safflower oil, sunflower oil, cottonseed oil, olive oil, and mixtures thereof.

20. A low cholesterol mayonnaise substitute according to claim 15, wherein said low cholesterol mayonnaise has viscosity, using a Brookfield RV Series viscometer with a TCD spindle at 4 rpm, of 90,000 to 200,000 centipoise.

21. A low cholesterol mayonnaise substitute according to claim 15, wherein said water constitutes 5 to 30 wt. % of said mayonnaise substitute, said food grade acidulent is vinegar and lemon juice together being present in an amount of 1.0 to 5.0 wt. % of said mayonnaise substitute, said edible oil is canola oil in an amount of 65 to 85 wt. % of said mayonnaise substitute, the egg white material constitutes 0.5 to 15 wt. % of said mayonnaise substitute, the food grade emulsifier is polyoxyethylene sorbitan monooleate which constitutes 0.05 to 0.50 wt. % of said mayonnaise substitute, and the at least one gum is a blend of xanthan gum, locust bean gum, and guar gum which constitutes 0.1 to 2.0 wt. % of said mayonnaise substitute.

22. A low cholesterol mayonnaise substitute containing substantially no egg yolk but having an improved texture profile and substantially the same flavor profile compared to real mayonnaise, which contains 79.50 wt. % soybean oil, 7.60 wt. % whole liquid eggs, 3.50 wt. % vinegar, 3.50 wt. % water, 3.50 wt. % salted egg yolks, 1.20 wt. % sodium chloride salt, 1.00 wt. % sugar, 0.10 wt. % lemon juice, 0.10 wt. % natural flavors, and 0.01 wt. % EDTA, wherein the texture profile has components of visual uniformity when cut with a knife, adhesiveness, denseness, and spreadability, while the flavor profile has components of fresh lemon, yellow mustard, white vinegar, whole cooked egg, aftertaste, sweet, sour, salt, green spices, paprika, and vegetable oil.

23. A mayonnaise substitute according to claim 22, wherein said mayonnaise substitute has a viscosity, using a Brookfield RV Series viscometer with a TCD spindle at 4 rpm, of 90,000 to 200,000 centipoise.

24. A process for preparing a low cholesterol mayonnaise substitute consisting essentially of the steps of:
mixing a slurry comprising an edible gum system and an edible oil with an aqueous solution containing a food grade emulsifier with an HLB of 10–18 to form an emulsifier blend;
blending an egg white material with said emulsifier blend;
adding edible oil to said emulsifier blend containing egg white material to form an oil-in-water emulsion; mixing a food grade acidulent with said oil-in-water emulsion; and homogenizing said oil-in-water emulsion containing said food grade acidulent to form said low cholesterol mayonnaise substitute.

25. A process according to claim 24, wherein said food grade acidulent is selected from the group consisting of polyoxyethylene sorbitan fatty acid esters, polyglycerol esters, ethoxylated mono- and di-glycerols, and mixtures thereof and constitutes 0.05 to 0.5 wt. % of said mayonnaise substitute, and wherein said gum system is selected from the group consisting of xanthan gum, guar gum, gum tragacanth, gum arabic, locust bean gum, alginates, pectins, and mixtures thereof and constitutes 0.1 to 2.0 wt. % of said mayonnaise substitute.

26. A process according to claim 24 with the further comprising the addition of:
flavoring;
spices; and
coloring.

27. A process according to claim 24, wherein said food grade acidulent is vinegar which constitutes 1.0 to 5.0 wt. % of said mayonnaise substitute.

28. A process according to claim 24, wherein said egg white material is selected from the group consisting of liquid egg whites, dried egg whites, and mixtures thereof, and wherein said egg white material constitutes 0.5 to 15 wt. % of said low cholesterol mayonnaise substitute.

29. A process according to claim 24, wherein said low cholesterol mayonnaise has a viscosity, using a Brookfield RV Series viscometer with a TCD spindle at 4 rpm, of 90,000 to 200,000 centipoise.

30. A process according to claim 24 further comprising:
adding gas bubbles to said oil-in-water emulsion containing said food grade acidulent before said homogenizing to lower the density of said low cholesterol mayonnaise substitute.

31. A process according to claim 30, wherein said gas bubbles are nitrogen.

* * * * *